(12) United States Patent
Kharul et al.

(10) Patent No.: US 6,420,511 B1
(45) Date of Patent: Jul. 16, 2002

(54) PROCESS FOR THE PREPARATION OF AROMATIC POLYESTERS

(75) Inventors: Ulhas K. Kharul; Sudhir S. Kulkarni, both of Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/312,975

(22) Filed: May 17, 1999

Related U.S. Application Data

(63) Continuation-in-part of application No. 09/181,900, filed on Oct. 29, 1998.

(30) Foreign Application Priority Data

Jan. 16, 1998 (IN) .......................................... 112/DEL/98

(51) Int. Cl.[7] .............................................. C08G 63/00

(52) U.S. Cl. ........................ 528/176; 528/179; 528/180; 528/190; 528/191

(58) Field of Search ................................ 528/176, 179, 528/180, 190, 191

(56) References Cited

U.S. PATENT DOCUMENTS 5,055,114 A * 10/1991 Kawakami et al. ............ 55/16

* cited by examiner

*Primary Examiner*—Samuel A. Acquah
(74) *Attorney, Agent, or Firm*—Ladas & Parry

(57) ABSTRACT

This invention relates to a process for the preparation of aromatic polyesters which comprises polymerization of a aromatic dicarboxylic acid substituted with a polar group weight percentage in the range of 20 to 75 with a substituted aromatic diol weight percentage in the range of 25 to 78 by known method herein described.

15 Claims, No Drawings

PROCESS FOR THE PREPARATION OF AROMATIC POLYESTERS

This is a continuation-in-part of copending application Ser. No. 09/181,900 filed on Oct. 29, 1998, claims the benefit thereof and incorporates the same by reference.

FIELD OF THE INVENTION

The present invention relates to the preparation of aromatic polyesters (polyarylates) based on polar group substituted aromatic dicarboxylic acids which are used for preparing membranes having improved gas permeation properties.

This is the continuation-in-part of our U.S. patent application Ser. No. 09/181,900 filed on Oct. 29, 1998.

1. Background

Polyesters are high performance engineering plastics with good combination of thermal, mechanical and gas permeation properties. Aromatic polyesters are engineering thermoplastics prepared from aromatic diols and aromatic dicarboxylic acids. Polyarylates based on polar group substituted bisphenols have been widely investigated. However, polyarylates with polar group substituted acid moieties have been paid less attention. One of the advantage of introducing polar groups in the polymer backbone is that it increases solubility in common solvents.

Aromatic polyesters based on polar group (such as halogen atoms, nitro group, sulfo group or a similar polar group or combination of these polar groups) substituted acid can have wide range of applications. One application is their use as membrane materials for the separation of mixture of gases or liquids. Membranes made of these polyarylates have generally superior permeation properties for separations such as hydrogen from methane, helium from nitrogen, or oxygen from nitrogen.

2. Prior Art

In the prior art, aromatic polyester (polyarylates) are prepared either by one phase (solution or melt) or two phase (interfacial) polycondensation methods [G. Allen et al, eds. Comprehensive Polymer Science, 1st ed, Pergaman press, Oxford, (1989); P. W. Morgan, Condensation Polymers by Interscience, NY (1965)]. P. K. Bhowmik et al (Macromolecules 26, 5287–5287–5294, 1993) have synthesized polyarylates based on bromoterephthalic acid and biphenyls or binaphthyls in 90–95% yields and moderate intrinsic viscosities by melt condensation method. Polyarylates based on bisphenol-A, hexaflurobisphenol-A, 9,9-bis (4-hydroxy phenyl) fluorene and 3-(4-hydroxyphenyl)-1,1, 3-trimethyl-5-indanol have been synthesized with tetrafluoro isophthalic acid (M. Kakimoto et al, J. Polym. Sci.: Part A: Polym. Chem., 25, 2747–2753, 1987) and with tetrafluoroterephthalic acid (Y. Oishi et al, J. Polym. Sci.: Part A: Polym. Chem., 27, 1425–1428, 1989) by interfacial and solution polymerization in good yields.

In the prior art, efforts to incorporate polar groups in the polymer have been reported in the literature for various types of polymers as typified in the following examples: Kawakami et al (Eur. Pat. Appln EP 444, 690,04 September 1991, CA: 115–257902) showed that the polyarylate based on tetrabromobisphenl-A and iso/terephthalic acid had a good oxygen selectivity over nitrogen. In an another report (Kawakami et al Eur. Pat. appln. EP 376, 234, on July 1990; CV: 114–63781) the use of tetrabromobisphenol-A and tetrachlorohexafluorobisphenol-A for making polyarylates with isophthalic acid is taught. Structural variations in other types of polymers are also reported in the literature. U.S. Pat. No. 4,840,686 (J. N. Anand et al, dated Jun. 20, 1989, CA: 112–9941) teaches the use of polycarbonate made from tetrabromobisphenol-A and iso/terephthalic acid (1/1) had permselectivity of $O_2$ over $N_2$ of 8.0 with $O_2$ permeability of 1.4 barrers. In an another report (Kawakami et al Eur. Pat. appl. EP 376, 234, Jul. 4, 1990, CA: 114–63781) use of tetrabromohexafluorobisphenol-A (TBrHFbisA) and tetrachlorohexafluorobisphenol-A (TClHFbisA) for making polyarylates with isophthalic acid is taught. The polyarylate TBrHFbisA-1 had $O_2/N_2$ selectivity of 6.7 with $O_2$ permeability of 5.25 barrers; while the polyarylate based on TClHFbisA-1 had $O_2/N_2$ selectivity of 6.1 with $O_2$ permeability of 5.64 barrers. Polar group substituted bisphenols are also reported in other types of polymers. U.S. Pat. No. 4,840,686 (J. N. Anand et al, dated Jun. 20, 1989, CA: 112–9941) teaches the use of polycarbonate made from tetrabromobisphenol-A and phosgene. This polymer gave $O_2/N_2$ selectivity of 7.4.

Gas permeation properties of polyarylates prepared from isophthalic and terephthalic acid or the mixture of the above acids with various substituted bisphenols have been reported in the literature. Gas permeation properties of polyarylates based on isophthalic acid or t-butyl-isophthalic acid and various substituted bisphenols have been studied (M. R. Pixton and D. R. Paul, Macromolecules, 28 (1995) pp 8277–8286). The effect of halogenation of bisphenol and phenolphthalein on the gas permeation properties of iso/ terephthalic acid based polyarylates has been reported (R. T. Chern and C. N. Provan, J. Membr. Sci., 59, (1991) pp 293–304). The effect of bisphenol bridge substitution on the gas permeation properties of resulting iso/terephthalates has also been reported. (A. Y. Houde et al, J. Membr. Sci., 103, (1995) pp 167–174) The effect of bisphenol ring substitution on the gas permeation properties of iso/terephthalates has been studied (U. K. Kharul and S. S. Kulkarni, Polymer, submitted).

None of the previous efforts have examined the effect of polar group substitutions on the acid moiety in polyarylates as a method of obtaining polymers with attractive gas permeation characteristics.

Preparation of aromatic polyesters based on polar group substituted aromatic dicarboxylic acid A very few reports are found in the literature in which the nitro or bromo substituted 1,3- or 1,4-benzene dicarboxylic acid (iso or terephthalic acid) have been used for the preparation of polyesters. Preparation of liquid crystalline polyarylates based on various hydroquinones (Hq, methoxy-HQ, t-butyl-Hq, Hq-sulfonic acid) with bromo or nitro substituted terephthalic acids have been reported (Makromol. Chem. 191, 1990, pp 225–235; Macromolecules, 25, 1992, p 7107–7113). A liquid crystalline copolymer based on Br-TPA and TPA with 1, 2-benzene diol and 1,4-benzene diol has been reported (JP 07,233,249; Sep. 5, 1995; CA: 124:57077). The synthesis of polymers based on bisphenol-A with nitro-isophthalic acid or nitro-terephthalic acid have been cited in the literature (Polymer International, 29, 1992, pp 61–68; Alexandria J. Pharm. Sci. 5, 1991, pp 78–82). No transport properties for any of these polymers have been measured. None of the previous efforts have examined the effect of polar group substitutions on the acid moiety in polyarylates as a method of obtaining polymers with attractive gas permeation characteristics. In other words, no report were found on polymers prepared from polar group substituted acids with various substituted bisphenols (i.e., bisphenols having different bridge/ring substitution, substituted bisphenols containing cardo groups, bisphenols based on fluorenone).

OBJECTS OF THE INVENTION

To overcome the drawbacks associated with the prior art process, the present invention provides an improved process for the preparation of aromatic polyesters by polymerization of the bisphenol along with a suitable additive in order to obtain aromatic polyesters having high intrinsic viscosity.

Another object of present invention is to provide an improved process for the preparation of aromatic polyesters based on tetra-substituted bisphenol and polar group substituted aromatic dicarboxylic acid having high viscosity and yield.

In a further object of the present invention is to prepare aromatic polyesters (polyarylates) based on a polar group substituted aromatic dicarboxylic acids with substituted bisphenols having high gas permeability as well as selectivity.

Another object of the invention is to prepare such type of polyarylates to achieve high solubility of these polyarylates in common solvents.

SUMMARY OF THE INVENTION

Accordingly, the present invention is directed to a novel process for the preparation of a polyarylates (aromatic polyesters) with high gas permeability as well as selectivity based on polar groups substituted aromatic dicarboxylic acids with substituted disphenols.

The said process for the preparation of aromatic polyesters comprises polymerization of a aromatic dicarboxylic acid substituted with a polar group weight percentage in the range of 20 to 75 with a substituted aromatic diol weight percentage in the range of 25 to 78.

DETAILED DESCRIPTION OF THE INVENTION

Accordingly, the present invention is directed to a novel process for the preparation of a polyarylates (aromatic polyesters) with high gas permeability as well as selectivity based on polar groups substituted aromatic dicarboxylic acids with substituted disphenols.

The said process for the preparation of aromatic polyesters comprises polymerization of an aromatic dicarboxylic acid substituted with a polar group weight percentage in the range of 20 to 75 with a substituted aromatic diol weight percentage in the range of 25 to 78 by known methods herein described.

In one embodiment, the process for the preparation of aromatic polyesters comprises the steps of (a) polymerizing a polar group substituted aromatic dicarboxylic acid having weight percentage in the range of 20 to 75, with an alkali metal salt of tetra-substituted aromatic diol having weight percentage in the range of 25 to 78 in presence of a solubilizing additive having weight percentage in the range of 2 to 20 at a temperature in the range of −5 to 80° C. for a period in the range of 1 to 36 hr with stirring, (b) adding the reaction mixture to a nonsolvent, (c) separating and purifying the precipitated polymer by conventional methods (d) drying the polymer at a temperature in the range of 40 to 80° C. for a period of 24 to 48 hours to obtain pure polymer.

In another embodiment, process for the preparation of polyarylates comprises the steps of a) dissolving the bisphenol in aqueous NaOH or KOH solution;
b) adding suitable phase transfer agent;
c) adding the acid chloride already dissolved in an organic phase under vigorous stirring for 0–4 hours;
d) precipitation of the polymer in a suitable nonsolvent;
e) drying in an oven at 40–80° C., preferably at 50–60° C.;
f) purification of the polymer by dissolving in a suitable solvent;
g) reprecipitation of the polymer in a suitable nonsolvent; and
h) drying in an oven at 40–80° C., preferably at 50–60° C., preferably in a vacuum oven, yielding the polyarylate having intrinsic viscosity of 0.3 to 1 dL/g in sym-tetrachloroethane. This polymer was then used for measurement of gas permeation properties.

In yet another embodiment, the tetra-substituted bisphenol used has the structural formula wherein $R_1$, $R_2$ represent alkyl groups containing
$C_1$ to $C_{10}$, $CF_3$, phenyl, or,

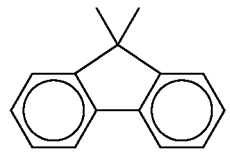

or combination of these groups and $R_3$, $R_4$ represent alkyl group containing $C_1$ to $C_5$, phenyl, F, Cl, Br, I or combination of these groups.

In a further embodiment, the tetra-substituted bisphenol has the structural formula wherein R represents alkyl group containing $C_1$ to $C_5$, phenyl, F, Cl, Br, or I or combination of these groups.

In yet another embodiment, the bisphenol is selected from tetramethylbisphenol-A, tetrachlorobisphenol-A, dimethylbisphenol-A, tetramethylhexafluorobisphenol-A, hexaflurobisphenol-A, tetrachlorohexafluorobisphenol-A, phenolphthalein, o-cresolphthalein, 4,4'-(9-fluorenylidene) bis(2,6-dimethylphenol), tetramethylphenolphthalein, tetrabromobisphenol-A, tetrabromohexafluorobisphenol-A, 4,4'-(9-fluorenylidene)bis-(2,6-dibromophenol), 4,4'(9-fluorenylidene)diphenol, 4,4'-(9-fluorenylidine) diphenol, 4,4'(9-fluorenylidene) di-o-cresol, bis(2-bromo-6-methylphenol), tetrabromophenolphthalein, dibromodimethylbisphenol-A, dibromodimethylhexafluorobisphenol-A, 4,4'(9-fluorenylidene)bis(2-bromo-6-methylphenol), dibromodimethylphenolphthalein and any other tetra-substituted dihydric phenols or tetra-substituted bisphenols.

In yet another embodiment, the polar group substituted aromatic dicarboxylic acid has the structural formula wherein $R_1$, $R_2$, $R_3$, $R_4$=F, Cl, Br, I or any other polar group or combination of these groups
or $R_1$, $R_2$, $R_3$=F, Cl, Br, I or any other polar group or combination of these groups and, $R_4$=H
or $R_1$, $R_2$=F, Cl, Br, I, or any other polar group or combination of these groups and $R_3$ $R_4$=H or $R_1$=F,Cl, Br, I, $NO_2$, $SO_3$, H or $SO_3$ Na or any other polar group and $R_2$, $R_3$, $R_4$=H and wherein one/two/three or all four H atoms of the phenyl ring are replaced by a polar group such as halogen atom (F, Cl, Br or I), $NO_2$, $SO_3H$ or $SO_3Na$.

In still another embodiment, the dicarboxylic acid is selected from monobromoisophthalic acid, monobromoterephthalic acid, mono-chloroisophthalic acid, monochloroterephthalic acid, monofluoroisophthalic acid, monofluoroterephthalic acid, nitroterephthalic acid, dibromoisophthalic acid, dibromoterephthalic acid, dichloroisophthalic acid, dichloroterephthalic acid difluoroisophthalic acid, difluoroterephthalic acid, tetrabromisophthalic acid, tetrabromoterephthalic acid, tetrachloroisophthalic acid, tetrachloroterephthalic acid, tetrafluoroisphthalic acid, tetrafluoroterephthalic acid, sulfoterephthalic or any other polar group or halogen atom substituted aromatic dicarboxylic acid.

In yet another embodiment, the additive is selected from crown ether quaternary ammonium salt, tetrabutyl ammonium bromide or benzyltriethyl ammonium chloride.

In a further embodiment, the solvent for polymerization is selected from chloroform, methylene chloride, dioxane, tetrahydrofuran, nitrobenzene, dimethylformamide and dimethylacetamide and similar organic solvents.

In yet another embodiment, the nonsolvent is selected from acetone, methyl ethyl ketone, methanol, ethanol, or other simple alcohols and ketones or combinations thereof.

In another embodiment, the solvent for making polymer solution is selected from chloroform, methylene chloride, tetrachloromethane, dioxane, tetrahydrofuran, nitrobenzene, toluene, dimethylformamide, dimethylacetamide and other similar organic solvents.

In another embodiment, polymerization reaction is carried out at a temperature in the range of 40° C. to 80° C.

In another embodiment, the polymerization reaction is carried out at the stirring rate of 0 to 5000 rpm.

Still another embodiment, the tetrasubstituted bisphenol is dissolved in aqueous alkali metal hydroxide is preferably selected from sodium or potassium hydroxide.

Accordingly, the present invention discloses the preparation of new polyarylates (aromatic polyesters) with high gas permeability as well as selectivity which are based on polar group substituted aromatic dicarboxylic acids with substituted bisphenols. The method of preparation of these polyarylates, preparation of membranes and their gas permeation properties comprises:

Preparation of polyarylates:

These polyarylates were prepared by either solution or interfacial polycondensation of aromatic diols [substituted bisphenols, phenolphthalein, substituted phenolphthaleins, 4,4'-(9-fluorenylidene)diphenol, substituted 4,4'-(9-fluorenylidene)diphenol] with polar group substituted aromatic dicarboxylic acid chlorides. These acid chlorides were in turn prepared from their respective acids either by refluxing that acid in 4 molar equivalent of thionyl chloride for 3 to 12 hours using N,N-dimethyl formamide as a catalyst or reacting the acid with $PCl_5$. Thus, formed acid chlorides were reacted with various dihydric phenols by usual polymerization techniques such as solution or interfacial polymerization techniques. The solution polymerization technique comprises reacting a dihydric phenol with an acid chloride using an organic base such as trialkylamine, preferably triethylamine in an organic solvent such as but not limited to chloroform, dichloromethane, tetrachloromethane, nitrobenzene or tetrahydrofuran. The interfacial polymerization technique comprises dissolving the bisphenol in aqueous NaOH or KOH solution, adding suitable phase transfer agent like tetralkyl ammonium halide or crown ether: followed by adding the acid chloride already dissolved in an organic phase such as but not limited to dichloromethane, chloroform, nitrobenzene or tetrahydrofuran under vigorous stirring for 0–4 hours. This is followed by precipitation of the polymer in a suitable nonsolvent such as but not limited to methanol or acetone and its drying in an oven at 40–80° C., preferably at 50–60° C. Polymer purification consists of dissolving it in a suitable solvent like chloroform, dichloromethane, tetrachloroethane or tetrahydrofuran and then reprecipitating the polymer in a suitable nonsolvent like acetone or methanol; followed by its drying in an oven at 40–80° C., preferably at 50–60° C., preferably in a vacuum oven, yielding the polyarylate having intrinsic viscosity of 0.3 to 1 dL/g in sym-tetrachloroethane. This polymer was then used for measurement of gas permeation properties.

Preparation of membranes:

Membrane films were prepared by solution casting which involves making 1–10% (w/w) of polymer solution in a suitable solvent such as but not limited to chloroform, methylene chloride, dioxane, tetrahydrofuran, toluene, dimethylformamide or dimethylacetamide, filtering this solution and then pouring it onto a flat glass surface, allowing the solvent to evaporate for 8–24 hours at 25–40° C., preferably at 35° C. in the dry atmosphere, then peeling off the formed film. Residual solvent was removed by drying these films in a vacuum oven at 50–60° C. for a week. Gas permeabilities were measured using the variable volume method as described before (A. Y. Houde, PhD thesis, University of Poona, India, pp.82). The unit of permeability used is the Barrer which is defined as $10^{-10}$ $cm^3(STP).cm/cm^2.sec.cm$ Hg. The selectivity is the ratio of permeabilities for two gases.

These polyarylates are easily processed into membrane form as they are soluble in common solvents such as but not limited to chloroform, methylene chloride, dioxane, tetrahydrofuran, toluene, dimethylformamide and dimethylacetamide. For gas separation applications, the solution of these polymers in the above stated solvents can be used to form hollow fiber membranes or flat sheet membranes by phase inversion or thin film composite membranes by dip coating method. Membranes made of these polyarylates have generally superior permeation properties for gas separation such as hydrogen from methane, helium from nitrogen, oxygen from nitrogen etc. In particular, the polyarylates have an excellent separation factor for various gas pairs coupled with adequately high intrinsic helium, hydrogen and oxygen permeabilities.

EMBODIMENTS

In one of the embodiments of the present invention, the aromatic diol used may be tetramethylbisphenol-A, tetrabromobisphenol-A, tetrachlorobisphenol-A, dimethylbisphenol-A, dibromodimethylbisphenol-A, hexafluorobisphenol-A, tetramethylhexafluorobisphenol-A, tetrabromohexafluorobisphenol-A, tetrachlorohexafluorobisphenol-A, phenolphthalein, tetramethylphenolphthalein, tetrabromophenolphthalein, o-cresolphthalein, dibromodimethyl phenolphthalein, 4,4'-(9-fluorenylidene)diphenol, 4,4'-(9-fluorenylidene)di-o-cresol, 4,4'-(9-fluorenylidene)bis(2,6-dimethylphenol), 4,4'-(9-fluorenylidene)bis(2,6-dibromophenol) and other substituted dihydric phenols or substituted bisphenols as shown in following FIG. 1.

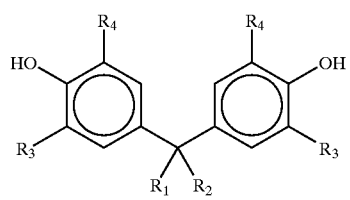

FIG. 1. Structure of the bisphenols used in the present work where, $R_1=R_2=CH_3$ or $CF_3$ or phenyl or $R_1$, $R_2$ =

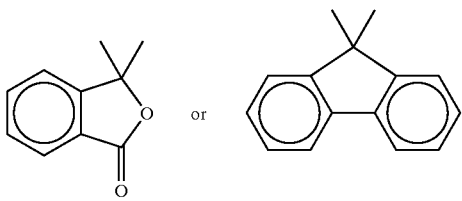

$R_3$=CH$_3$ or Br
$R_4$=H, or CH$_3$, or Br

In an another embodiment of the present work, the aromatic dicarboxylic acid used may be as shown in following FIG. 2, wherein one or two or all substituents from $R_1$ to $R_4$ are polar group such as halogen atom, or nitro i.e. the acid could be either but not limited to monobromoisophthalic acid, monobromoterephthalic acid, monochloroisophthalic acid, monochloroterephthalic acid, monofluoroisophthalic acid, monofluoroterephthalic acid, nitroterephthalic acid, dibromoisophthalic acid, dibromoterephthalic acid, dichloroisophthalic acid, dichloroterephthalic acid, difluoroisophthalic acid, difluoroterephthalic acid, tetrabromoisophthalic acid, tetrabromoterephthalic acid, tetrachloro isophthalic acid, tetrachloroterephthalic acid, tetrafluoroisophthalic acid, tetrafluoroterephthalic acid, sulfoterephthalic acid or other polar group substituted aromatic dicarboxylic acids.

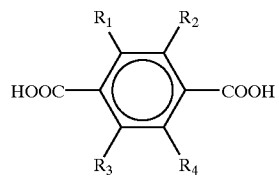

FIG. 2. Structure of the aromatic dicarboxylic acids used in the present work where, $R_1$, $R_2$, $R_3$, $R_4$=F, Cl, Br, I or similar polar group or $R_1$, $R_2$, $R_3$, =F, Cl, Br, I or similar polar group and $R_4$=H or $R_1$, $R_2$, =F, Cl, Br, I, NO$_2$ or similar polar group and $R_3$, $R_4$=H or $R_1$, =F, Cl, Br, I, NO$_2$, SO$_3$H, or SO$_3$Na or similar polar group and $R_2$, $R_3$, $R_4$=H.

The process of the present invention is described with following examples which are illustrative only, and should not be construed to limit the scope of the present invention in any manner. In these examples, the procedure for making these polyarylates is described following by their intrinsic gas permeation properties. The unit of permeability used in the Barrer which is defined as $10^{-10}$ cm$^3$(STP).cm/cm$^2$.sec.cm Hg. The selectivity is the ratio of permeabilities for two gases.

EXAMPLE 1
Synthesis and gas permeation properties of polyarylate obtained from o-cresolphthalein and nitroterephthaloyl dichloride (o-Cp-NT):

15 ml of methylene chloride, 1.73 g ($5\times10^{-3}$ mol) of o-cresolphthalein (o-Cp) and 1.11 g ($1.1\times10^{-2}$ mol) of triethylamine were stirred for ten minutes in a 50 ml capacity flask equipped with nitrogen gas inlet. 1.302 g of nitroterephthaloyl dichloride (NT, $5.25\times10^{-3}$ mol) were dissolved separately in 5 ml of methylene chloride and this solution was added dropwise to the above mixture containing o-cresolphthalein with stirring over a period of 30 minutes. Stirring continued for 3 hours after addition was completed. The polymer was then precipitated by pouring the reaction mixture in an excess of methanol, filtered under suction and dried in an oven at 50° C. It was further purified by dissolving in chloroform, filtering the solution and reprecipitating in an excess of methanol The polymer was filtered under suction and dried in vacuum at 50° C. to obtain 2.58 g (97% yield) of pure polymer which has intrinsic viscosity of 0.67 dL/g in sym-tetrachloroethane at 35° C.

The purified polymer was further used for preparing a membrane film by solution casting. 0.5 g of the polymer was dissolved in 15 ml of chloroform with stirring for 10 hours. The formed solution was filtered and then poured into a flat bottomed petrie dish floating on mercury. The petri dish was loosely covered with an aluminium foil. The solvent was allowed to evaporate slowly for 24 hours in a dry atmosphere and at 35° C. The formed film was peeled off and kept in an vacuum oven at 50–60° C. for 8–10 days in under to evaporate the residual solvent.

The obtained film (membrane) of 40–70 micron thickness was mounted in a cell and the gas permeation rates were measured at 35° C. and pressure differential across the film corresponding to 150 psi/ambient pressure. The gas permeability for various gases in o-Cp-NT are shown in Table 1. Polymer o-Cp-NT has permeabilities for He and O$_2$ of 8.2 barrer and 0.25 barrer respectively with He/CH$_4$ and O$_2$/N$_2$ selectivities of 410 and 5 respectively. Comparative data with the polyarylate (o-Cp-T) prepared with a conventional, nonsubstituted acid (T) shows permeation for He and O$_2$ of 13.3 barrer and 1.04 barrer respectively with He/CH$_4$ and O$_2$/N$_2$ selectivities of 74 and 6.9 respectively. The gas permeability data for o-Cp-NT are presented in Table 1.

TABLE 1

Permeability and selectivity for various gas pairs for polyarylate prepared from o-cresolphthalein and nitroterephthaloyl dichloride (o-Cp-NT).

| Gas | Permeability in Barrers | Gas Pair | Selectivity |
| --- | --- | --- | --- |
| He | 8.2 | He/N$_2$ | 165 |
| Ar | 0.09 | He/CH$_4$ | 410 |
| N$_2$ | 0.05 | H$_2$/CH$_4$ | 275 |
| O$_2$ | 0.25 | O$_2$/N$_2$ | 5 |
| CH$_4$ | 0.02 | CO$_2$/CH$_4$ | 59 |
| CO$_2$ | 1.13 | | |
| H$_2$ | 5.5 | | |

EXAMPLE 2
Synthesis and permeation properties of polyarylates based on dimethylbisphenol-A and nitroterephthaloyl dichloride (DMbisA-NT):

15 ml of methylene chloride, 1.28 g ($5\times10^{-3}$ mol) of dimethylbisphenol-A (DMbisA) and 1.11 g ($1.1\times10^{-2}$ mol) of triethylamine stirred for ten minutes in a 50 ml capacity flask equipped with nitrogen gas inlet. 1.302 g of nitroterephthaloyl dichloride ($5.25\times10^{-3}$ mol) dissolved in 5 ml of methylene chloride and the solution was added dropwise to above reaction mixture with stirring over a period of 30 minutes. Stirring continued for 3 hours. The polymer was precipitated by pouring the reaction mixture in an excess of methanol, filtered under suction and dried in an oven at 50° C. It was further purified by dissolving in chloroform, filtering the solution and reprecipitating in an excess of methanol. The polymer was filtered under suction and dried in vacuum at 50° C. to obtain 2.04 g (92% yield) of pure polymer which had intrinsic viscosity of 0.82 dL/g in sym-tetrachloroethane at 35° C.

The purified polymer was further used for preparing membrane by solution casting 0.5 g of the polymer was dissolved in 15 ml of chloroform with stirring for 10 hours. The formed solution was filtered and then poured into a flat bottomed petrie dish floating on mercury. The petri dish was loosely covered with an aluminium foil. The solvent was allowed to evaporate slowly for 24 hours in a dry atmosphere and at 35° C. The formed film was peeled off and kept in an vacuum oven at 50–60° C. for 8–10 days in order to evaporate the residual solvent.

The obtained film (membrane) of 40–70 micron thickness was mounted in a cell designed to measure gas permeation rates at 35° C. and pressure differential across the film corresponding to 150 psi/ambient pressure. The gas permeability for various gases in (DMbisA-NT) are shown in Table 2. Polymer (DMbisA-NT) has permeabilities for He and $O_2$ of 11.2 barrer and 0.46 barrer respectively with He/$CH_4$ and $O_2/N_2$ selectivities of 320 and 7.7 respectively. Comparative data with the polyarylate (DMbisA-T): prepared with a conventional, nonsubstituted acid (T) shows permeation for He and $O_2$ of 18 barrer and 1.12 barrer respectively with He/$CH_4$ and $O_2/N_2$ selectivities of 106 and 4.9 respectively. The gas permeability for various gases in DMbisA-NT are shown in Table 2.

TABLE 2

Permeability and selectivity for various gas pairs for polyarylate prepared from dimethylbisphenol-A and nitroterephthaloyl dichloride (DMbisA-NT).

| Gas | Permeability in Barrers | Gas Pair | Selectivity |
|---|---|---|---|
| He | 11.2 | He/$N_2$ | 187 |
| Ar | 0.18 | He/$CH_4$ | 320 |
| $N_2$ | 0.06 | $H_2$/$CH_4$ | 240 |
| $O_2$ | 0.46 | $O_2/N_2$ | 7.7 |
| $CH_4$ | 0.035 | $CO_2$/$CH_4$ | 59 |
| $CO_2$ | 1.8 | | |
| $H_2$ | 8.4 | | |

EXAMPLE 3

Synthesis and permeation properties of polyarylate based on tetramethylbisphenol-A and nitroterephthaloyl dichloride (TMbisA-NT):

In a 50 ml capacity flask equipped with a nitrogen gas inlet, were placed 15 ml of methylene chloride, 1.64 g ($5\times10^{-3}$ mol) of disodium tetramethylbisphenolate and 0.114 g ($5\times10^{-4}$ mol) of benzyltriethyl ammonium chloride. To this reaction mixture, 1.302 g ($5.25\times10^{-3}$ mol) of nitroterephthaloyl dichloride dissolved in 5 ml of methylene chloride were added dropwise with stirring for a period of 30 minutes. The reaction mixture was further stirred overnight and then poured into an excess of methanol. The precipitated polymer was separated by filtration and washed with water. This polymer was further purified by dissolving it in chloroform, filtering and precipitating methanol. The precipitate was filtered under suction and dried in vacuum to obtain 1.95 g (83%) yield of pure polymer which had intrinsic viscosity of 0.36 dL/g in sym-tetrachloroethane at 35° C.

0.5 g of the polymer prepared as described above was dissolved in 15 ml of chloroform with stirring for 10 hours. The solution was filtered and then poured into a flat bottomed petrie dish floating on mercury and loosely covered with an aluminium foil. The film of 40 micron thickness was formed after the petrie dish was kept in a dry atmosphere for 24 hours at 40° C. The film was peeled off from the glass surface and was put in a vacuum oven at 60–65° C. for a week. It was then allowed to cool down at room temperature and mounted in a cell designed to measure gas permeation rates.

The obtained film (membrane) of 40–70 micron thickness was mounted in a cell designed to measure gas permeation rates at 35° C. and pressure differential across the film corresponding to 150 psi/ambient pressure. The gas permeability for various gases in (TMbisA-NT) are shown in Table 3. Polymer (TMbisA-NT) has permeabilities for He and $O_2$ of 27 barrer and 2.3 barrer respectively with He/$CH_4$ and $O_2/N_2$ selectivities of 129 and 6.6 respectively. Comparative data with the polyarylate (TMbisA-T): prepared with a conventional, nonsubstituted acid (T) shows permeation for He and $O_2$ of 50 barrer and 7.3 barrer respectively with He/$CH_4$ and $O_2/N_2$ selectivities of 38 and 5.1 respectively. The gas permeability for various gases in TMbisA-NT are shown in Table 3.

TABLE 3

Permeability and selectivity for various gas pairs for polyarylate prepared from tetramethylbisphenol-A and nitroterephthaloyl dichloride (TMbisA-NT).

| Gas | Permeability in Barrers | Gas Pair | Selectivity |
|---|---|---|---|
| He | 27 | He/$N_2$ | 77 |
| Ar | 1.17 | He/$CH_4$ | 129 |
| $N_2$ | 0.35 | $H_2$/$CH_4$ | 105 |
| $O_2$ | 2.3 | $O_2/N_2$ | 6.6 |
| $CH_4$ | 0.21 | $CO_2$/$CH_4$ | 50 |
| $CO_2$ | 10.5 | | |
| $H_2$ | 22 | | |

EXAMPLE 4

Synthesis and permeation properties of polyarylate based on tetramethylbisphenol-A and bromoterephthaloyl dichloride (TMbisA-BrT).

15 ml of methylene chloride, 1.42 g ($5\times10^{-3}$ mol) of tetramethylbisphenol-A and 1.11 g ($1.1\times10^{-2}$ mol) of triethylamine was stirred in a 50 ml capacity flask equipped with nitrogen gas inlet. 1.48 g of bromoterephthaloyl dichloride (BrT, $5.25\times10^{-3}$ mol) dissolved in 5 ml of methylene chloride and added dropwise to above reaction mixture with stirring over a period of 15 minutes. Stirring continued for 3 hours and the reaction mixture poured into an excess of methanol. Polymer was collected under suction and dried in an oven at 50° C. It was further purified by dissolving it in chloroform, filtering the solution and reprecipitating in methanol. It was finally dried in a vacuum oven at 50° C. to obtain 2.1 g (83% yield) of pure polymer which had intrinsic viscosity of 0.47 dL/g in sym-tetrachloroethane at 35° C.

0.5 g of the polymer prepared as described above was dissolved in 15 ml of chloroform with stirring for 10 hours. The solution was filtered and then poured into a flat bottomed pert dish floating on mercury and loosely covered with an aluminium foil. The film of 40 micron thickness was formed after the pert dish was kept in a dry atmosphere for 24 hours at 40° C. The film was peeled off from the glass surface and was put in a vacuum oven at 60–65° C. for a week. It was then allowed to cool down at room temperature and mounted in a cell designed to measure gas permeation rates.

The obtained film (membrane) of 40–70 micron thickness was mounted in a cell designed to measure gas permeation rates at 35° C. and pressure differential across the film corresponding to 150 psi/ambient pressure. The gas permeability for various gases in (TMbisA-BrT) are shown in Table 4. Polymer (TMbisA-BrT) has permeabilities for He and $O_2$ of 39 barrer and 2.7 barrer respectively with He/$CH_4$ and $O_2/N_2$ selectivities of 122 and 5.9 respectively. Comparative data with the polyarylate (TMbisA-T): prepared with a conventional, nonsubstituted acid (T) shows permeation for He and $O_2$ of 50 barrer and 7.3 barrer respectively with He/$CH_4$ and $O_2/N_2$ selectivities of 38 and 5.1 respectively. The gas permeability for various gases in TMbisA-NT are shown in Table 4.

TABLE 4

Permeability and selectivity for various gas pairs for polyarylate prepared from tetramethylbisphenol-A and bromoterephthaloyl dichloride (TMbisA-Brt).

| Gas | Permeability in Barrers | Gas Pair | Selectivity |
|---|---|---|---|
| He | 39 | He/$N_2$ | 85 |
| Ar | 1.2 | He/$CH_4$ | 122 |
| $N_2$ | 0.46 | $H_2$/$CH_4$ | — |
| $O_2$ | 2.7 | $O_2/N_2$ | 5.9 |
| $CH_4$ | 0.32 | $CO_2/CH_4$ | 43 |
| $CO_2$ | 10.5 | | |

EXAMPLE 5

Synthesis and permeation properties of polyarylate based on dibromodimethylbisphenol-A and nitroterephthaloyl dichloride (DBrDMbisA-NT):

In a 50 ml capacity flask equipped with a nitrogen gas inlet, were placed 15 ml of methylene chloride, 2.069 g ($5 \times 10^{-3}$ mol) of dibromodimethylbisphenol-A and 0.114 g ($5 \times 10^{-4}$ mol) of benzyltriethyl ammonium chloride. To this reaction mixture, 1.302 g ($5.25 \times 10^{-3}$ mol) of nitroterephthaloyl dichloride dissolved in 5 ml of methylene chloride were added dropwise with stirring for a period of 30 minutes. The reaction mixture was further stirred overnight and then poured into an excess of methanol. The precipitated polymer was separated by filtration and washed with water. This polymer was further purified by dissolving it in chloroform, filtering and precipitating methanol. The precipitate was filtered under suction and dried in vacuum to obtain 2.7 g (92%) yield of pure polymer which had intrinsic viscosity of 0.36 dL/g in sym-tetrachloroethane at 35° C.

0.5 g of the polymer prepared as described above was dissolved in 15 ml of chloroform with stirring for 10 hours. The solution was filtered and then poured into a flat bottomed petrie dish floating on mercury and loosely covered with an aluminium foil. The film of 40 micron thickness was formed after the petrie dish was kept in a dry atmosphere for 24 hours at 40° C. The film was peeled off from the glass surface and was put in vacuum oven at 60–65° C. for a week. It was then allowed to cool down at room temperature and mounted in a cell designed to measure gas permeation rates.

The obtained film (membrane) of 40–70 micron thickness was mounted in a cell designed to measure gas permeation rates at 35° C. and pressure differential across the film corresponding to 150 psi/ambient pressure. The gas permeability for various gases in (DBrDMbisA-NT) are shown in Table 5. Polymer (DBrDMbisA-NT) has permeabilities for He and $O_2$ of 19.5 barrer and 1.2 barrer respectively with He/$CH_4$ and $O_2/H_2$ selectivities of 195 and 7.1 respectively. Comparative data with the polyarylate (DBrDMbisA-T) prepared with a conventional, nonsubstituted acid (T) shows permeation for He and $O_2$ of 39 barrer and 4.2 barrer respectively with He/$CH_4$ and $O_2/N_2$ selectivities of 61 and 6.3 respectively. The gas permeability for various gases in DBrDMbisA-NT are shown in Table 5.

TABLE 5

Permeability and selectivity for various gas pairs for polyarylate prepared from dibromodimethylbisphenol-A and nitroterephthaloyl dichloride (DBrDMbisA-NT).

| Gas | Permeability in Barrers | Gas Pair | Selectivity |
|---|---|---|---|
| He | 19.5 | He/$N_2$ | 115 |
| Ar | 0.46 | He/$CH_4$ | 195 |
| $N_2$ | 0.17 | $H_2$/$CH_4$ | — |
| $O_2$ | 1.2 | $O_2/N_2$ | 7.1 |
| $CH_4$ | 0.1 | $CO_2/CH_4$ | 46 |
| $CO_2$ | 4.6 | | |

ADVANTAGES OF THIS WORK

1. The polyarylates prepared from aromatic diol and polar group substituted aromatic dicarboxylic acids such as nitroterephthalic or bromoterephthalic acid have in general adequate gas permeability and excellent selectivity compared to polyarylates made from the same aromatic diol and conventional acids such as isophthalic or terephthalic acid; thus these new polyarylates can be used as membrane materials for gas separations such as hydrogen from methane, helium from nitrogen, oxygen from nitrogen etc.
2. One of the advantages of the present work is that these aromatic polyesters are easily soluble at ambient temperature in common solvents such as but not limited to chloroform, methylene chloride, dioxane, tetrahydrofuran, toluene, dimethylformamide and dimethylacetamide. Hence these aromatic polyesters are easily processed into hollow fiber or flat sheet membrane form or to thin film composite type membranes.
3. The another advantage of these polyarylates is that they are made from readily available aromatic diols and dicarboxylic acids by conventional solution or interfacial polycondensation method with high viscosity and yield.
4. The polyarylates made from o-cresolphthalein or dimethylbisphenol-A with nitroterephthalic acid have high selectivity for He and $H_2$ with good permeability. The polyarylates made from tetramethylbisphenol-A with nitroterephthalic acid or bromoterephthalic acid has excellent permeability and good selectivity for He, $H_2$ as well as for $O_2$.

What is claimed is:

1. A process for the preparation of aromatic polyesters comprising
   (a) polymerizing (i) an aromatic dicarboxylic acid substituted with a polar group and (ii) an alkali metal salt of a tetra-substituted aromatic diol in a reaction mixture in the presence of a solvent consisting essentially of an organic solvent at a temperature in the range of −5 to 80° C. for a period of 1to 36 hours with stirring of the reaction mixture, said reaction mixture comprising the dicarboxylic acid in an amount of 20–75 weight percent, the alkali metal salt of a tetra-substituted aromatic diol in an amount of 25 to 78 weight percent and the solvent in an amount of 2 to20 weight percent;
   (b) adding the reaction mixture to a nonsolvent to cause precipitation of a polymer;
   (c) separating and purifying the precipitated polymer; and
   (d) drying the polymer at a temperature in a range of 40–80° C. for 24 to 48 hours.

2. A process as claimed in claim 1, wherein the polymerizing comprises the steps of
 (a) dissolving a bisphenol in an aqueous NaOH or KOH solution;
 (b) adding a phase transfer agent;
 (c) adding an acid chloride already dissolved in an organic phase under vigorous stirring for 0–4 hours to form a polymer;
 (d) precipitating the polymer in a suitable nonsolvent;
 (e) drying the polymer in an oven at 40–80° C.;
 (f) purifying the polymer by dissolving in a solvent;
 (g) reprecipitating the polymer in a suitable nonsolvent; and
 (h) drying in an oven at 40–80° C. to yield the polyarylate having an intrinsic viscosity of 0.3 to 1 dL/g in sym-tetrachloroethane.

3. A process as claimed in claim 1, wherein the tetra-substituted aromatic diol is a bisphenol of Formula I:

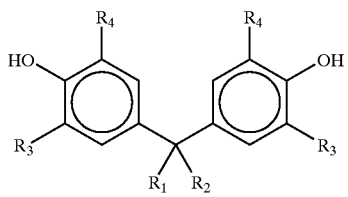

Formula I wherein $R_1$ and $R_2$ are alkyl groups containing $C_1$ to $C_{10}$, $CF_3$, phenyl,

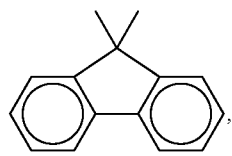

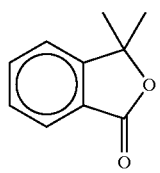

or a combination of these groups and $R_3$ and $R_4$ are alkyl groups containing $C_1$ to $C_5$, phenyl, F, Cl, Br, or I or a combination of these groups.

4. A process as claimed in claim 1, wherein the tetra-substituted aromatic diol is a bisphenol of Formula I and wherein R is an alkyl group containing $C_1$ to $C_5$, phenyl F, Cl, Br, or I or a combination of these groups.

5. A process as claim in claim 1, wherein the aromatic diol is a bisphenol selected from the group consisting of tetramethylbisphenol-A, tetrachlorobisphenol-A, dimethylbisphenol-A, tetramethylhexafluorobisphenol-A, hexafluorobisphenol-A, tetrachlorohexafluorobisphenol-A, phenolphthalein, o-cresolphthalein, 4,4'-(9-fluorenylidene) bis(2,6-dimethylphenol), tetramethylphenolphthalein, tetrabromobisphenol-A, tetrabromohexafluorobisphenol-A, 4,4'-(9-fluorenylidene)bis(2,6-dibromophenol), 4,4'(9-fluorenylidene)diphenol, 4,4'-(9-fluorenylidine) diphenol, 4,4'-(9-fluorenylidene di-o-cresol, bis(2-bromo-6-methylphenol), tetrabromophenolphthalein, dibromodimethylbisphenol-A, dibromodimethylhexafluorobisphenol-A, 4,4'-(9-fluorenylidene)bis(2-bromo-6-methylphenol), dibromodimethylphenolphthalein and any other tetra-substituted dihydric phenols or tetra-substituted bisphenols.

6. A process as claimed in claim 1, wherein the polar group substituted aromatic dicarboxylic acid is of Formula II:

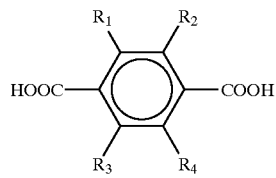

Formula II wherein $R_1$, $R_2$, $R_3$, $R_4$=F, Cl, Br, I or any other polar group or combination of these groups or
 $R_1$, $R_2$, $R_3$=F, Cl, Br, I or any other polar group or combination of these groups and $R_4$=H or
 $R_1$, $R_2$=F, Cl, Br, I, $NO_2$ or any other polar group or combination of these groups and $R_3$ and $R_4$=H or
 $R_1$=F, Cl, Br, I, $NO_2$, $SO_3H$ or $SO_3Na$ or any other polar group and $R_2$, $R_3$, $R_4$=H and wherein one/two/three or all four H atoms of the phenyl ring are replaced by a polar group comprising a halogen atom, $NO_2$, $SO_3H$, or $SO_3Na$.

7. A process as claimed in claim 1, wherein said dicarboxylic acid is selected from the group consisting of monobromoisophthalic acid, monobromoterephthalic acid, monochloroisophthalic acid, monochloroterephthalic acid, monofluoroisophthalic acid, monofluoroterephthalic acid, nitroterephthalic acid, dibromoisophthalic acid, dibromoterephthalic acid, dichloroisophthalic acid, dichloroterephthalic acid, difluoroisophthalic acid, difluoroterephthalic acid, tetrabromisophthalic acid, tetrabromoterephthalic acid, tetrachloroisophthalic acid, tetrachloroterephthalic acid, tetrafluoroisphthalic acid, tetrafluoroterephthalic acid, and sulfoterehthalic acid.

8. A process as claimed in claim 1, wherein the additive comprises a phase transfer agent or a nonsolvent selected from the group consisting of ether quaternary ammonium salt, tetrabutyl ammonium bromide and benzyltriethyl ammonium chloride.

9. A process as claimed in claim 1, wherein the solvent is selected from the group consisting of chloroform, methylene chloride, dioxane, tetrahydrofuran, nitrobenzene, dimethylormamide, and dimethylacetamide.

10. A process as claimed in claim 1, wherein the nonsolvent is selected from the group consisting of acetone, methyl ethyl ketone, methanol, ethanol, other simple alcohols and ketones and combinations thereof.

11. A process as claimed in claim 5, wherein the solvent used for making polymer solution is selected from chloroform, methylene chloride, tetrachloromethane, dioxane, tetrahydrofuran, nitrobenzene, toluene, dimethylformamide, and dimethylacetamide.

12. A process as claimed in claim 1, wherein the polymerizing is carried out at a temperature in the range of 40° C. to 80° C.

13. A process as claimed in claim 1, wherein the polymerizing is carried out with stirring at a range of 0 to 5000 rpm.

14. A process as claimed in claim 1, wherein the tetra-substituted aromatic diol is prepared by dissolving an aromatic diol in aqueous alkali metal hydroxide.

15. A process as claimed in claim 14, wherein the alkali metal hydroxide is sodium or potassium.

* * * * *